United States Patent

Biskner et al.

[11] Patent Number: 5,779,895
[45] Date of Patent: Jul. 14, 1998

[54] GRANULAR MEDIA FILTER INCLUDING MEDIA SETTLER ASSEMBLY

[75] Inventors: Charles D. Biskner, Ames, Iowa; James C. Young, Boalsburg, Pa.

[73] Assignee: General Filter Company, Waukesha, Wis.

[21] Appl. No.: 787,230

[22] Filed: Jan. 22, 1997

Related U.S. Application Data

[63] Continuation of Ser. No. 601,685, Feb. 15, 1996, abandoned.

[51] Int. Cl.⁶ ................................ B01D 24/46
[52] U.S. Cl. ................ 210/274; 210/275; 210/521
[58] Field of Search .................. 210/275, 521, 210/274, 794

[56] References Cited

U.S. PATENT DOCUMENTS

| | | | |
|---|---|---|---|
| 1,069,737 | 8/1913 | Stevenson | 210/275 |
| 2,888,140 | 5/1959 | Hebert | 210/275 |
| 3,313,420 | 4/1967 | Hirsch | 210/275 |
| 3,491,892 | 1/1970 | McCann | 210/521 |
| 3,666,112 | 5/1972 | Pielkenrood et al. | 210/521 |
| 3,741,401 | 6/1973 | Hsiung | 210/521 |
| 4,076,625 | 2/1978 | Scholten et al. | 210/274 |
| 4,322,299 | 3/1982 | Scholten et al. | 200/794 |
| 4,479,880 | 10/1984 | Treanor | 210/275 |
| 5,154,824 | 10/1992 | Anderson | 210/275 |
| 5,198,108 | 3/1993 | Savall et al. | 210/265 |
| 5,207,905 | 5/1993 | O'Brien et al. | 210/274 |
| 5,227,077 | 7/1993 | Shea | 210/275 |
| 5,286,392 | 2/1994 | Shea | 210/275 |

Primary Examiner—Cynthia L. Nessler
Attorney, Agent, or Firm—Michael, Best & Friedrich

[57] ABSTRACT

A granular media filter including a settler assembly for reducing media loss during high-turbulence washing of media in the granular media filter. The settler assembly is comprised of plates, tubes, or other porous materials placed between a system of baffles and a conventional backwash trough. The settler assembly reduces turbulence near the overflow weir edge of the backwash trough, thereby reducing media carry over with the backwash water into the backwash trough. The trough baffle settler assembly will allow higher backwash rates per backwash with the same or lower media losses than experienced with previous trough-baffle designs, thereby reducing costs of construction and operation of granular media filter systems. The settler assembly is particularly adapted for use with granular media filters employing simultaneous application of air and water to produce a high turbulence backwash.

19 Claims, 4 Drawing Sheets

GRANULAR MEDIA FILTER INCLUDING MEDIA SETTLER ASSEMBLY

This is a continuation of application Ser. No. 08/601,685, filed Feb. 15, 1996, now abandoned.

FIELD OF THE INVENTION

The invention relates to granular media filters and more particularly to backwash trough and baffle arrangements for use in facilitating backwashing of the media in the filter to provide for cleaning of the media.

BACKGROUND PRIOR ART

Granular media filters are commonly used to remove particulate solids from water in water and wastewater treatment plants. These filters typically employ sand, crushed coal, granular activated carbon (GAC), crushed garnet or a combination of these or similar granular materials as filter media. The water to be filtered is passed through the filter media and the particulate solids are trapped at the surface of the filter media and in the interstitial spaces within the filter media. The entrapped particulate solids are removed from the filter media by a periodic washing operation called backwashing in which water or a water/air combination is passed upwardly through the filter media at sufficient velocities to carry the particulate solids upwardly. The backwash water and entrained particulate solids are intercepted by a backwash water collector typically consisting of a pipe or trough. Because of turbulence caused by the backwashing process, grains of the filter media can become entrained in the backwash water stream and are carried over the overflow weir edge of the backwash trough and are removed or lost from the filter. The media loss is particularly severe when using low density media such as crushed coal or when using air to assist in scouring the entrapped particulate solids from the filter.

One prior art granular media filter is shown in U.S. Pat. No. 4,076,625 and includes means intended to reduce media loss and consisting of baffles placed adjacent to or surrounding the backwash trough to intercept and deflect the air used in the backwash process. The baffles reduce the velocity and turbulence of water currents near the overflow weir edge of the backwash trough to thereby reduce media loss. This design requires additional depth in the filter system to accommodate installation of the baffling system. While design of new filter systems allows the additional depth to be accounted for in the design stages, retrofitting of existing filter systems with the baffles is not always possible due to the limited height available in the filter tanks. In addition, the ability of such trough and baffle configurations to eliminate media loss is limited to specific media type, grain size, spatial arrangements of the baffles and the media surface, and the magnitude of air and water rates used for backwashing. For instance, the trough baffle design may increase media loss for filter medias consisting of anthracite coal and GAC due to increased localized velocities created by the baffles.

SUMMARY OF THE INVENTION

The granular media filter embodying the present invention has a construction which eliminates shortcomings of prior art trough baffle designs and includes a baffle assembly which minimizes loss of media during the backwashing process, reduces the height required in the filter to accommodate the baffling system, allows for installation of the baffling system in an existing system and eliminates the need for additional structure height to be added for new systems. The baffle assembly in the granular media filter of the invention includes a settler assembly which provides for reduced localized fluid velocities and more uniform fluid velocity in the collection area adjacent to the overflow weir of the backwash trough.

The granular media filter embodying the invention includes a tank for containing liquid and a bed of filter media for filtering liquid flowing through the bed of filter media, and a means for washing the bed of filter media. That means for washing includes means for selectively supplying water or a mixture of air and water into the tank below the bed of filter media and for causing upward flow of fluid through the bed of filter media to clean the media. The granular filter further includes a backwash trough positioned above the filter media bed and for draining off backwash liquid when fluid is supplied upwardly through the bed of filter media to wash the media. A baffle assembly is provided for controlling upward fluid flow around the backwash trough and for deflecting upwardly flowing air and fluid entrained with media grains away from the backwash trough, the baffle assembly including at least one baffle portion spaced from the backwash trough. The granular media filter further includes a settler assembly located between the baffle portion and the backwash trough, the settler assembly including means defining a plurality of flow passages for preventing turbulent flow of backwash liquid flowing upwardly between the backwash trough and the baffle plate.

The invention further includes a trough baffle settler assembly for use in a granular media filter including a tank containing a bed of filter media, the trough baffle settler assembly comprising a backwash trough in the upper portion of the tank and for draining off backwash liquid produced during washing of the filter media in the tank. A baffle is also provided for controlling upward flow during washing of the filter media, the baffle located in adjacent spaced relation to the backwash trough and including at least one baffle plate having a portion for deflecting upwardly flowing fluid and entrained media grains away from the backwash trough. A settler assembly is located between the baffle and the backwash trough, the settler assembly including means defining a plurality of flow passages for controlling flow upwardly with respect to the backwash trough and for preventing turbulent flow upwardly between the backwash trough and the baffle plate.

Figure 1:
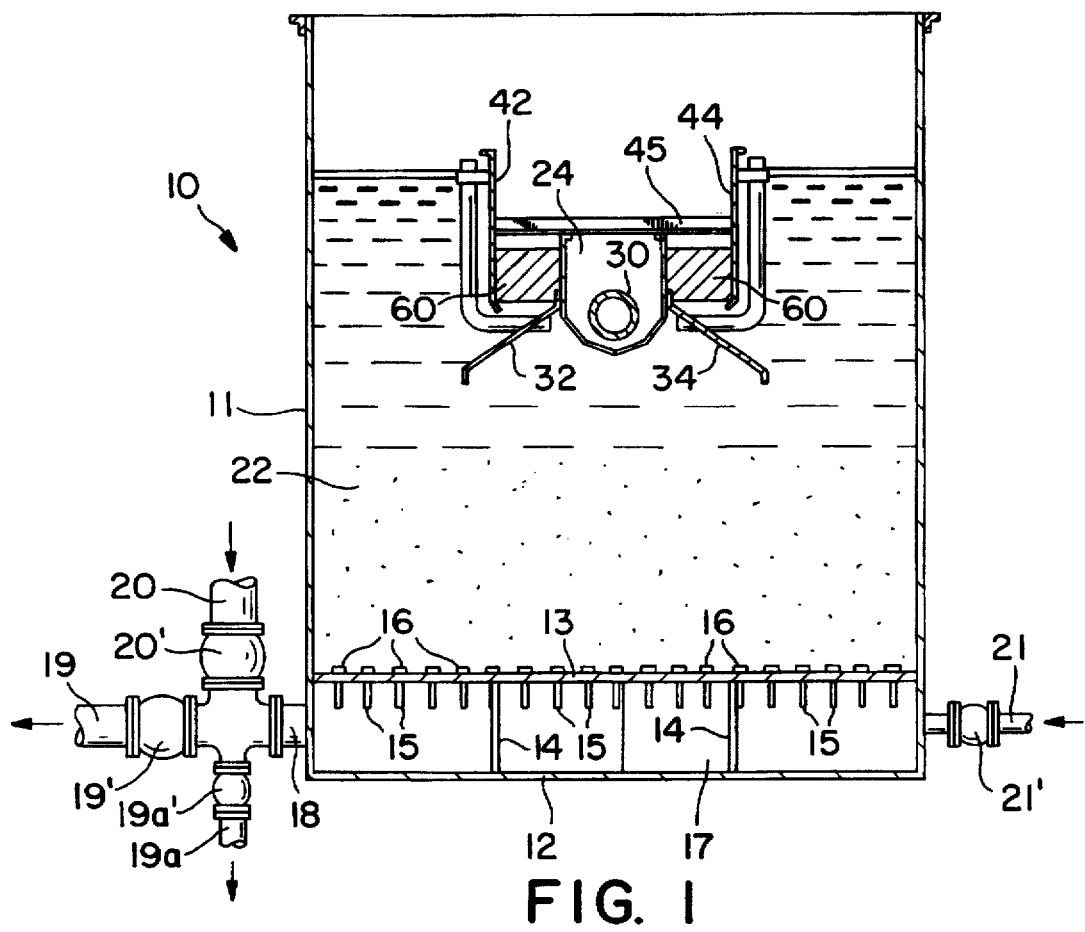
FIG. 1 is a cross section elevation view of a granular media filter embodying the invention.

Before several embodiments of the invention are explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF A PREFERRED EMBODIMENT

Illustrated in FIG. 1 is a granular media filter embodying the invention and including a tank 10. The tank 10 has a top, side walls 11, and a closed bottom 12. Spaced upwardly from bottom 12 is an underdrain plate 13, supported by bracing 14 and connected to the tank sidewalls 11 by welding or other suitable means to form a water-tight seal therebetween. Extending through plate 13 are a plurality of nozzle tubes 15 having strainer caps 16 on the top thereof above plate 13. A granular media bed 22 comprised of granular filtering materials, such as sand, sand and gravel, coal, garnet, GAC etc. is provided above the underdrain plate 13. The granular media bed 22 may also be comprised of several different granular filtering materials, such as granular materials of different average size, different density, or combinations thereof, etc. The granular media bed 22 is used to remove particulate solids from a water stream by passing the water to be filtered downwardly through the granular media bed 22. During downflow filtration the water to be filtered passes downwardly through the media bed, through the strainers 16 and the nozzles 15 into the underdrain chamber 17 and is removed through pipe connection 18 to the filtered water outlet pipe 19. A drainpipe 19a is also provided.

During operation of the granular media filter 10, it is necessary to periodically remove the filtered material from the granular media bed 22 by washing the media. During washing, water is supplied under pressure through pipe 20 to pipe 18 and chamber 17 for passing upwardly through nozzle tubes 15 and strainers 16. Also during washing, air is preferably supplied under pressure through pipe 21 which connects with underdrain chamber 17. Air enters the nozzles through holes in the upper portions of nozzle tubes 15 while water enters through the lower ends of the nozzle tubes. Alternate means of adding the air to the filter can be used, for example, as through a distribution grid placed within or immediately below the granular media filter bed 22. The pipes 19, 19a, 20 and 21 are commonly provided with separate shut-off valves 19', 19a', 20' and 21', respectively.

The entrapped particulate solids are removed from the filter granular media by the action of passing the water or a combination of water and air upwardly through the filter media bed 22 until the entrapped particulate solids are released from the media. The mixture of water, air, and particulate solids flows upwardly and the water and particulate solids are removed through a trough 24 extending across an upper portion of the tank 10 the trough 24 being supported at its opposite ends (not shown) by the upper portion of the tank.

Figure 2:
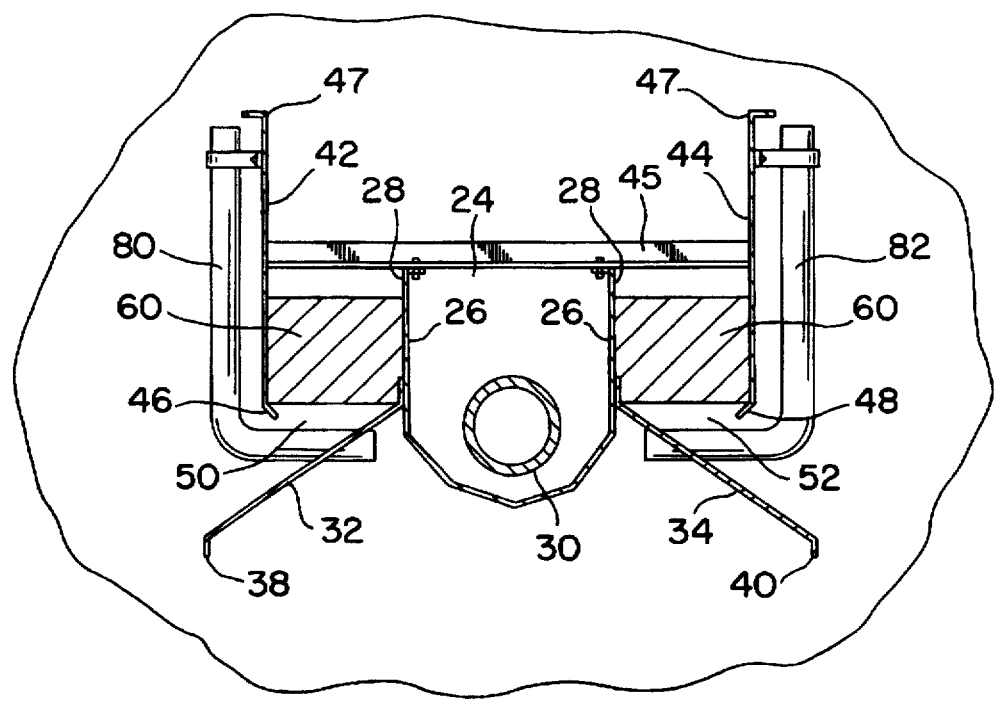
FIG. 2 is an enlarged cross section view of the trough and baffle assembly of the granular media filter shown in FIG. 1 and including the settler assembly.

The trough 24 is shown in greater detail in FIG. 2 and includes opposite vertical sides 26 and is open at the top. The upper edges 28 of the sides 26 of the trough 24 function as overflow weirs to permit flow of liquid and particulate solids into the trough 24 to be carried away through the discharge pipe 30. A pair of baffles 32 and 34 are fixed to opposite sides of the trough 24 and adjacent lower portions of the vertical sides 26. The baffles 32 and 34 in the illustrated arrangement of FIG. 2 extend downwardly and away from the lower portions of the vertical sides 26. The baffle 32 includes a lower edge 38. The other baffle 34 similarly includes a lower edge 40. The baffles 32 and 34 function to deflect the flow of water and entrained particulate solids and air bubbles upwardly and outwardly away from the trough 24. During the media cleaning operation, introduction of air into the upwardly flowing water has the effect of causing turbulence in the media to better separate filtered material from the media, but the increased turbulence in the upwardly flowing water can also function to carry media particles upwardly and into the trough 24. The baffles 32 and 34 function to deflect the flow of water and air bubbles outwardly away from the trough 24 and to permit the media particles to settle back into the media bed 22 rather than being carried into the trough 24 with the wash water.

In the arrangement shown in FIG. 2, a second pair of baffles 42 and 44 are positioned above the baffles 32 and 34, respectively, and are spaced outwardly from the sides of the trough 24. The baffle 42 extends generally vertically and includes a lower edge 46 spaced upwardly from an intermediate portion of the downwardly extending baffle 32. The baffle 44 also extends generally vertically and has a lower edge 48 spaced upwardly from an intermediate portion of baffle 34. In the specific embodiment of the invention shown in FIGS. 1 and 2, the baffles 42 and 44 are supported by a horizontally extending brace member 45 in turn supported by the trough 24. The upper edges 47 of the vertical baffles 42 and 44 extend upwardly above the upper edges of the trough 24. The vertical baffles 42 and 44 are intended to prevent flow of water at the water surface toward the trough 24. Accordingly, the water or liquid flowing into the trough 24 must flow through the space or flow channel 50 between the lower edge 46 of the vertical baffles 42 and the upper surface of the downwardly inclined baffle 32 and through the flow channel 52 between lower edge 48 of baffle 44 and baffle 34.

Figure 3:
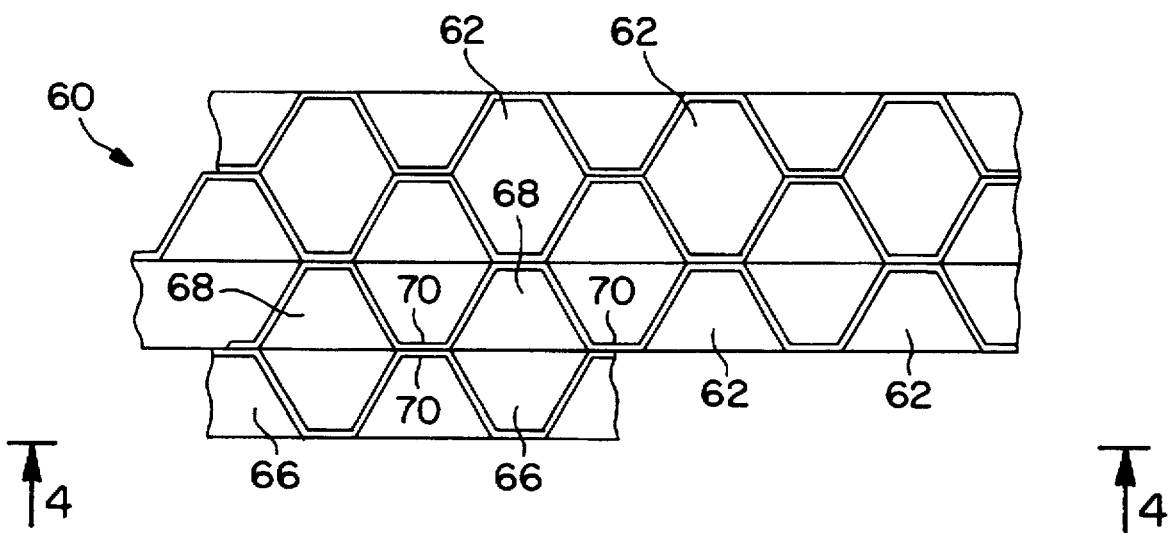
FIG. 3 is an enlarged plan view of the settler assembly shown in FIG. 2.
Figure 4:
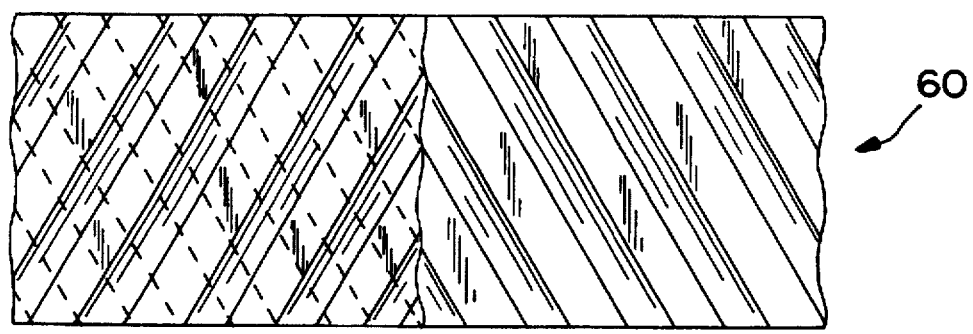
FIG. 4 is an enlarged elevation view of the settler assembly shown in FIG. 2 and with the portions broken away.
Figure 5:
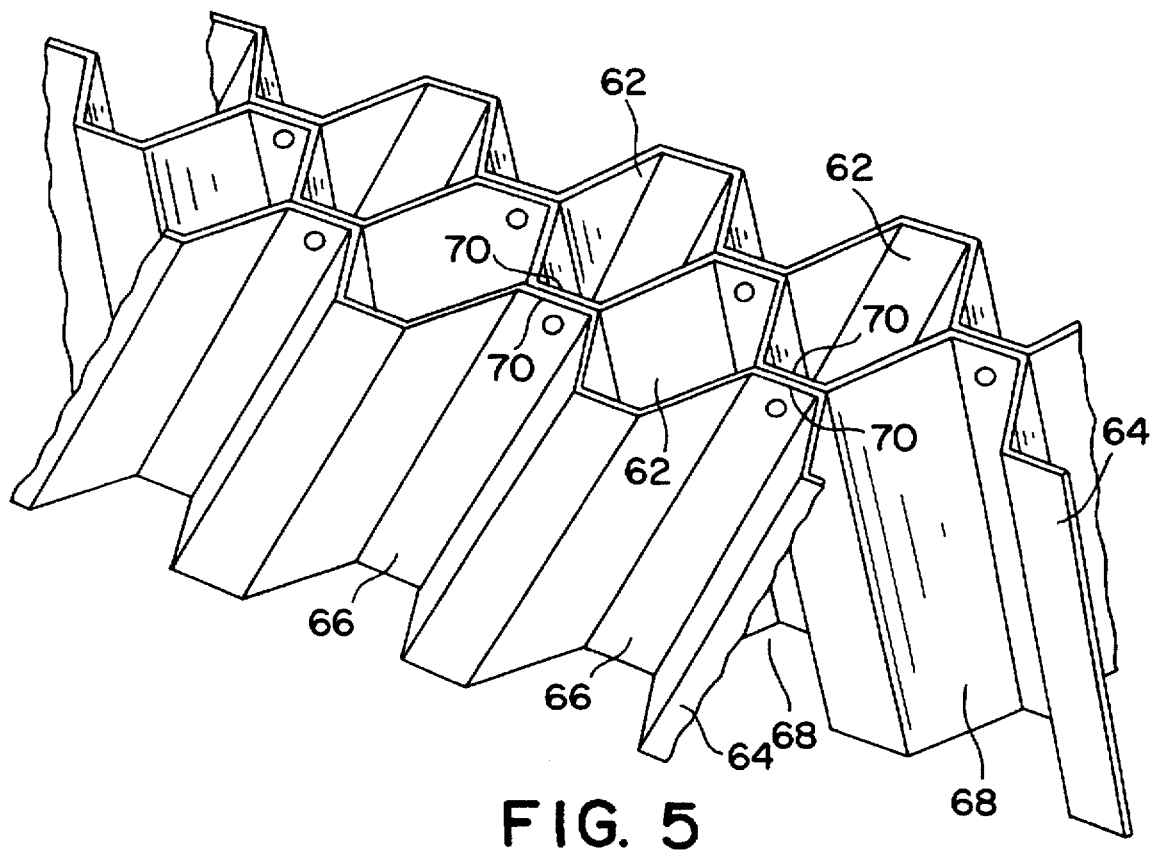
FIG. 5 is an enlarged perspective view of the settler assembly shown in FIGS. 3 and 4.

Means are also provided for controlling turbulence and for dissipating the local velocities in the liquid flowing upwardly through the flow channels 50 and 52 and to prevent media entrained in that liquid from flowing into the overflow trough 24. This means includes a pair of settler assemblies 60 positioned above the downwardly inclined baffles 32 and 34, respectively, and between the vertical baffles 42 and 44 and the vertical sidewalls of the trough 24. Each settler assembly 60 includes an array of upwardly inclined channels or passages 62 (FIGS. 3–4) permitting fluid flow upwardly and over the edges of the trough by providing for uniform fluid flow and reducing turbulence in the liquid as it flows through the flow channels and over the upper edges of the trough 24. While the array of upwardly extending channels or passages 62 could be provided in other ways than those shown in the drawings, in the illustrated arrangement, the settler assembly is comprised of a plurality of plates or sheets 64 of corrugated material, the sheets 64 being placed together in face-to-face relation and fixed together. As best shown in FIGS. 3, 4 and 5, the sheets 64 are positioned together in stacked relation and such that the corrugations or channels 66 (FIG. 5) of a first set of alternate sheets 64 are inclined upwardly and parallel to the trough and the corrugations 68 of the adjacent alternate sheets 64 are inclined upwardly and parallel to the trough 24 such that the stacked alternate sheets 64 of corrugated material define flow passages 62 extending upwardly but inclined in opposite directions. In the illustrated arrangement, the corrugations are inclined upwardly at an angle of approximately 45° to 60°.

In one preferred form of the invention, the settler assembly 60 can be comprised of a corrugated media as shown in FIGS. 3–5 and comprising crossflow tube settler modules manufactured by Enviropax, Salt Lake City, Utah. The Enviropax crossflow tube settler modules are comprised of thin sheets 64 of plastic material, each sheet having a wavelike or corrugated configuration, and with one sheet 64 bonded to another sheet by joining the apexes 70 of one sheet to the apexes 70 of waves of the adjacent sheet 64 as best illustrated in FIG. 5.

In the arrangement illustrated in FIG. 2, means are also provided for exhausting air bubbles which are captured beneath the downwardly inclined baffle plates 32 and 34. This means comprises a pair of tubes 80 and 82 having lower ends extending through the baffle plates 32 and 34, respectively, and upper ends outwardly of the vertical baffles 42 and 44 and above the surface of the liquid in the tank.

Figure 6:
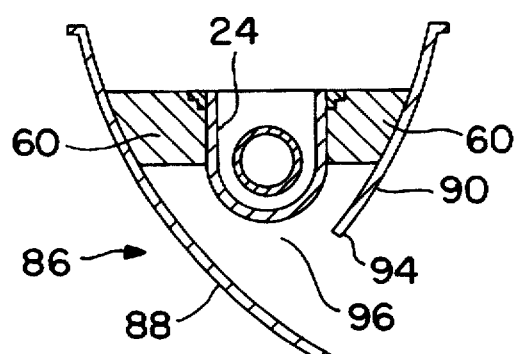
FIG. 6 is an illustration of an alternative embodiment of the trough baffle settler assembly shown in FIG. 2.

FIG. 6 illustrates an alternative embodiment of the invention and wherein a baffle assembly 86 is comprised of a pair of curved baffle plates 88 and 90, one of the baffle plates 88 being curved and having a lower end 92 extending downwardly under the trough 24 and the second curved baffle plate 90 positioned on the opposite side of the trough 24 and having a lower edge 94 positioned in spaced relation but adjacent the lower edge of the trough 24. A flow channel 96 is provided between the two baffle plates 88 and 90 to permit overflow liquid to flow into the trough 24. Settler assemblies 60 are provided between the baffle plate 88 and the trough 24 and between the baffle plate 90 and the trough 24.

Figure 7:
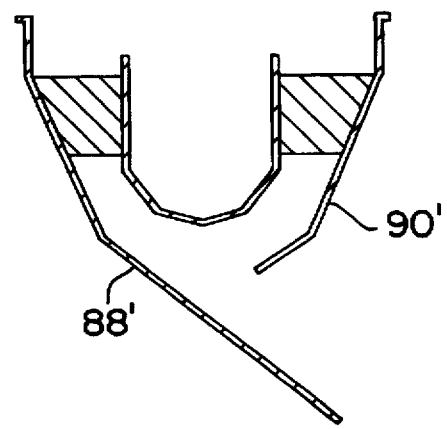
FIG. 7 is an illustration of another alternative embodiment of the trough baffle settler assembly shown in FIG. 2.

An alternative embodiment of the invention is illustrated in FIG. 7, similar to that shown in FIG. 6 and wherein the baffle plates 88' and 90' have an angular configuration.

Figure 8:
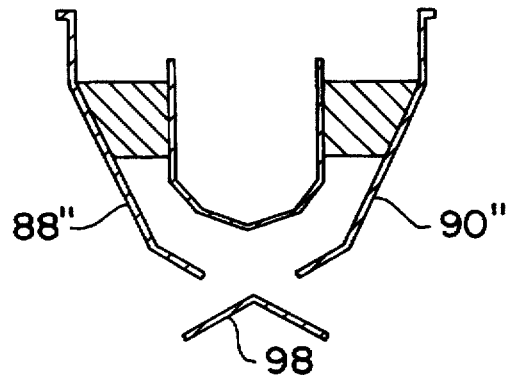
FIG. 8 is an illustration of another alternative embodiment of the trough baffle settler assembly shown in FIG. 2.

Another alternative embodiment of the baffle configuration is shown in FIG. 8 and wherein a deflector baffle 98 is positioned immediately below the trough 24 and functions to divert air and liquid entrained with media grains upwardly and outwardly away from the trough 24 and away from a pair of baffles 88" and 90".

Figure 9:
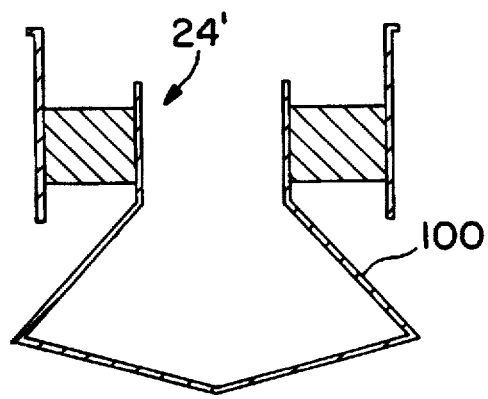
FIG. 9 is an illustration of another alternative embodiment of the trough baffle settler assembly shown in FIG. 2.

FIG. 9 illustrates another alternative embodiment of a baffle configuration and wherein the bottom portion of the trough 24' includes an integral baffle arrangement 100 for diverting upward flow of air and liquid entrained with media grains outwardly and away from the upper edges of the trough 24' and outwardly away from vertically extending baffles 42 and 44.

What is claimed is:

1. A granular media filter comprising:

a tank having an upper portion and a bottom for containing liquid and a bed of filter media for filtering liquid flowing downwardly through the bed of filter media, a liquid discharge in the bottom of the tank, a means for washing the bed of filter media, said means for washing including means for selectively supplying fluid into the tank below the bed of filter media and for causing upward flow of fluid through the bed of filter media to clean the media, a backwash trough in the tank positioned above the filter media bed for draining off backwash liquid when fluid is supplied upwardly through the bed of filter media to wash the media, the backwash trough having a length and including a lower portion and upwardly extending sides, at least one of the sides having an upper edge defining a weir, a baffle assembly for controlling upward fluid flow around the backwash trough and for deflecting upwardly flowing fluid and entrained media grains away from the backwash trough, the baffle assembly including at least one baffle portion spaced from the backwash trough, and a settler assembly located between the baffle portion and the backwash trough, the settler assembly including means defining a plurality of rows of flow passages for controlling upward fluid flow adjacent the backwash trough and preventing turbulent flow of backwash liquid flowing upwardly between the backwash trough and said baffle portion, the plurality of rows of flow passages being between the backwash trough and the baffle portion, the rows of flow passages extending along the length of the backwash trough and the rows of flow passages each being divided into a plurality of discrete and separate flow passages, the flow passages being separated with respect to one another and spaced substantially along the length of said backwash trough.

2. A granular media filter as set forth in claim 1 wherein the means defining the flow passages includes a means for defining a plurality of alternately upwardly inclined flow passages, wherein each of the flow passages is inclined with respect to the vertical direction, wherein each of the flow passages is inclined in a direction transverse to the length of the backwash trough, and wherein one of the flow passages is inclined in the direction transverse to the length of the backwash trough towards the backwash trough and the adjacent flow passage is inclined in the direction transverse to the length of the backwash trough away from the backwash trough.

3. A granular media filter as set forth in claim 2 wherein each flow passage has a plurality of walls defining the flow passage and wherein one of the walls of each flow passage is aligned in parallel relation to another of the walls of that flow passage.

4. A granular media filter as set forth in claim 1 wherein the means defining the flow passages includes a plurality of mutually adjacent plates.

5. A granular media filter as set forth in claim 4 wherein said plurality of mutually adjacent plates defines at least one of said plurality of rows of flow passages, and wherein at least one of the mutually adjacent plates has a corrugated configuration dividing said at least one of said plurality of rows of flow passages into said plurality of discrete and separate flow passages.

6. A granular media filter as set forth in claim 1 wherein the baffle assembly includes a baffle plate positioned in spaced adjacent relation to the lower portion of the backwash trough and deflecting upwardly flowing backwash liquid away from the backwash trough and a second baffle portion extending generally vertically and spaced outwardly from the other side of the backwash trough, the second baffle portion having an upper portion extending above the backwash liquid so that the backwash liquid cannot flow over the upper portion of the second baffle, the second baffle portion being spaced above the baffle plate and defining a backwash flow passage therebetween.

7. The granular media filter as set forth in claim 6 wherein the settler assembly is positioned between the second baffle portion and the backwash trough.

8. A trough baffle settler assembly for use in a granular media filter including a tank, the tank containing a bed of filter media and having an upper portion, the trough baffle settler assembly comprising:

a backwash trough in the upper portion of the tank and for draining off backwash liquid produced during washing of the filter media in the tank, the backwash trough having a length and including a lower portion and upwardly extending sides, at least one of the sides having an upper edge defining a weir, a baffle for controlling upward fluid flow during washing of the filter media, the baffle located in adjacent spaced relation to the backwash trough and including at least one baffle plate having a portion for deflecting upwardly flowing fluid and entrained media grains away from the backwash trough, and a settler assembly located between the baffle and the backwash trough, the settler assembly including means defining a plurality of rows of flow passages for controlling fluid flow upwardly with respect to the backwash trough and for preventing turbulent flow of fluid flowing upwardly between the backwash trough and baffle plate, a plurality of rows of flow passages being between the baffle and the backwash trough, the rows of flow passages extending along the length of the backwash trough, and the rows of flow passages each being divided into a plurality of discrete and separate flow passages, the flow passages being separated with respect to one another and spaced substantially along the length of said backwash trough.

9. A trough baffle settler assembly as set forth in claim 8 wherein the means defining the flow passages includes means for defining a plurality of alternately slanting upwardly inclined flow passages.

10. A trough baffle settler assembly as set forth in claim 9 wherein each flow passage has a plurality of walls defining the flow passage and wherein one of the walls of each flow passage is aligned in parallel relation to another of the walls of that flow passage.

11. A trough baffle settler assembly as set forth in claim 8 wherein the means for defining the flow passages includes a plurality of spaced apart plates.

12. A trough baffle settler assembly as set forth in claim 11 wherein the plurality of spaced apart plates are positioned in side-by-side relation and are generally vertically oriented, and wherein at least one of the plates has a corrugated configuration defining said plurality of discrete and separate flow passages.

13. A trough baffle settler assembly as set forth in claim 8 wherein the baffle includes a pair of baffle plates, one of the baffle plates projecting downwardly away from one side of the trough and the other of the baffle plates projecting downwardly and away from the other side of the trough.

14. A trough baffle settler assembly as set forth in claim 13 wherein the baffle includes a third baffle plate extending generally vertically and spaced outwardly from the other side of the backwash trough, the third baffle plate having a lower edge spaced upwardly from said one baffle plate and defining a flow passage therebetween, and the third baffle plate having an upper edge extending above the upper edge of the side of the backwash trough and extending above the fluid to prevent fluid from flowing over the upper edge of the third baffle plate, and wherein the settler assembly is positioned between the third baffle plate and the backwash trough.

15. A trough baffle settler assembly for use in a granular media filter including a tank, the tank containing a bed of filter media and having an upper portion, the trough baffle settler assembly comprising:

a backwash trough in the upper portion of the tank and for draining off backwash liquid produced during washing of the filter media in the tank, the backwash trough having a length and including a lower portion and upwardly extending sides, at least one of the sides having an upper edge defining a weir, a baffle for controlling upward fluid flow during washing of the filter media, the baffle located in adjacent spaced relation to the backwash trough, the baffle including at least three baffle plates, one of the baffle plates projecting downwardly away from one side of the trough and another of the baffle plates projecting downwardly and away from the other side of the trough, at least one baffle plate having a portion for deflecting upwardly flowing fluid and entrained media grains away from the backwash trough, a third one of the baffle plates extending generally vertically and spaced outwardly from the other side of the backwash trough, the third one of the baffle plates having a lower edge spaced upwardly from said one of the baffle plates and defining a flow passage therebetween, and the third one of the baffle plates having an upper edge extending above the upper edge of the side of the backwash trough and extending above the fluid to prevent fluid from flowing over the upper edge of the third one of the baffle plates, and a settler assembly located between the third one of the baffle plates and the backwash trough, the settler assembly including means defining a plurality of rows of flow passages for controlling fluid flow upwardly with respect to the backwash trough and for preventing turbulent flow of fluid flowing upwardly between the backwash trough and baffle plate, a plurality of rows of flow passages being between the baffle and the backwash trough, the rows of flow passages extending along the length of the backwash trough, and the rows of flow passages each including a plurality of discrete and separate flow passages, the flow passages being separated with respect to one another and spaced substantially along the length of said backwash trough.

16. A trough baffle settler assembly as set forth in claim 15 wherein the means defining the flow passages includes means for defining a plurality of alternately slanting upwardly inclined flow passages.

17. A trough baffle settler assembly as set forth in claim 16 wherein each flow passage has a plurality of walls defining the flow passage and wherein one of the walls of each flow passage is aligned in parallel relation to another of the walls of that flow passage.

18. A trough baffle settler assembly as set forth in claim 15 wherein the means for defining the flow passages includes a plurality of spaced apart plates, the plates defining therebetween a plurality of generally vertically upwardly extending channels between the plates.

19. A trough baffle settler assembly as set forth in claim 18 wherein the plurality of spaced apart plates are positioned in side-by-side relation and are generally vertically oriented and wherein at least one of the plates has a corrugated configuration and defines a plurality of generally vertically extending channels.

* * * * *